(12) United States Patent
Guo

(10) Patent No.: US 11,363,617 B2
(45) Date of Patent: Jun. 14, 2022

(54) METHOD AND DEVICE FOR BEAM REPORTING

(71) Applicant: GUANGDONG OPPO MOBILE TELECOMMUNICATIONS CORP., LTD., Guangdong (CN)

(72) Inventor: Li Guo, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/469,501

(22) Filed: Sep. 8, 2021

(65) Prior Publication Data
US 2021/0410160 A1    Dec. 30, 2021

Related U.S. Application Data

(63) Continuation of application No. PCT/CN2019/093858, filed on Jun. 28, 2019.

(51) Int. Cl.
| | | |
|---|---|---|
| *H04W 72/12* | (2009.01) | |
| *H04L 5/00* | (2006.01) | |
| *H04W 72/00* | (2009.01) | |
| *H04W 72/04* | (2009.01) | |
| *H04W 72/08* | (2009.01) | |

(52) U.S. Cl.
CPC ....... *H04W 72/1231* (2013.01); *H04L 5/0051* (2013.01); *H04W 72/005* (2013.01); *H04W 72/046* (2013.01); *H04W 72/082* (2013.01); *H04W 72/085* (2013.01); *H04W 72/1284* (2013.01)

(58) Field of Classification Search
CPC .......... H04W 72/1231; H04W 72/005; H04W 72/046; H04W 72/082; H04W 72/085; H04W 72/1284; H04L 5/0051
See application file for complete search history.

(56) References Cited

U.S. PATENT DOCUMENTS

| | | | |
|---|---|---|---|
| 2018/0262313 A1* | 9/2018 | Nam | .................... H04L 5/0044 |
| 2020/0015236 A1* | 1/2020 | Kung | .................. H04B 17/336 |

(Continued)

FOREIGN PATENT DOCUMENTS

| | | |
|---|---|---|
| WO | 2017167238 A1 | 10/2017 |
| WO | 2018126792 A1 | 7/2018 |

OTHER PUBLICATIONS

3GPP TSG RAN WG1 #96bis—R1-1904476—Xi'an, China, Apr. 8-12, 2019—MediaTek Inc., Enhancements on multi-beam operations (12 pages).

(Continued)

*Primary Examiner* — Kashif Siddiqui
(74) *Attorney, Agent, or Firm* — Perkins Coie LLP

(57) ABSTRACT

A method and device for beam reporting are provided. The method includes: using, by a terminal device, reference signal resources in a configured first set for channel measurement for a beam and reference signal resources in a configured second set for interference measurement for the beam; wherein the reference signal resources in the first set are associated by ordering with the reference signal resources in the second set; and calculating and reporting, by the terminal device, SINR, based on results of the channel measurement and the interference measurement.

17 Claims, 3 Drawing Sheets

S110
A terminal device uses reference signal resources in a configured first set for channel measurement for a beam and reference signal resources in a configured second set for interference measurement for the beam S120
The terminal device calculates and reports SINR based on results of the channel measurement and the interference measurement

(56) References Cited

U.S. PATENT DOCUMENTS

2020/0245270 A1* 7/2020 Harada ............... H04L 27/2613
2021/0211176 A1* 7/2021 Gao ..................... H04W 24/10

OTHER PUBLICATIONS

3GPP TSG RAN WG1 #97 Meeting—R1-1907317—Reno, Nevada, USA, May 13-May 17, 2019—Nokia, Nokia Shanghai Bell, Enhancements on Multi-beam Operation (22 pages).
3GPP TSG RAN WG1 Meeting #97—R1-1907892—Reno, USA, May 13-17, 2019—Intel Corporation, Summary 2 on L1-SINR and SCell BFR (22 pages).
3GPP TSG RAN WG1 Meeting #97—R1-1906446—Reno, USA, May 13-May 17, 2019—Fujitsu, Enhancements on multi-beam operation (7 pages).
International Search Report dated Mar. 26, 2020 of PCT/CN2019/093858 (2 pages).
Examination Report for Indian Application No. 202117039338 dated Mar. 14, 2022. 6 pages with English translation.

* cited by examiner

METHOD AND DEVICE FOR BEAM REPORTING

CROSS-REFERENCE TO RELATED APPLICATION

The present application is a continuation application of International PCT Application No. PCT/CN2019/093858, filed on Jun. 28, 2019, the entire content of which is hereby incorporated by reference.

TECHNICAL FIELD

Implementations of the present disclosure relate to the communication field, and more particularly, to methods and device for beam reporting.

BACKGROUND

The 5G (fifth-generation) wireless systems are generally a multi-beam based system, where multiplex Tx and Rx analog beams are employed by BS (Base Station) and/or UE to combat the large path loss in high frequency band. There is a need for the UE to measure and report information about link quality of the beams to the BS, so that the BS and UE could communicate through beams with appropriate quality.

SUMMARY

The present disclosure provides methods and devices for beam reporting, so that the BS and UE could select appropriate beams for communication based on the reporting.

In a first aspect, a method for beam reporting is provided. The method includes: using, by a terminal device, reference signal resources in a configured first set for channel measurement for a beam and reference signal resources in a configured second set for interference measurement for the beam; wherein the reference signal resources in the first set are associated by ordering with the reference signal resources in the second set; and calculating and reporting, by the terminal device, SINR (Signal-to-Interference and Noise Ratio) based on results of the channel measurement and the interference measurement.

In a second aspect, a method for beam reporting is provided. The method includes: using, by a terminal device, reference signal resources in a configured first set for channel measurement and interference measurement for a beam; and calculating and reporting, by the terminal device, a SINR (Signal-to-Interference and Noise Ratio) based on results of the channel measurement and the interference measurement.

In a third aspect, a terminal device is provided. The terminal device includes: a channel and interference measurement unit, used for using reference signal resources in a configured first set for channel measurement for a beam and reference signal resources in a configured second set for interference measurement for the beam; wherein the reference signal resources in the first set are associated by ordering with the reference signal resources in the second set; and a calculating and reporting unit, used for calculating and reporting SINR (Signal-to-Interference and Noise Ratio) based on results of the channel measurement and the interference measurement.

In a fourth aspect, a terminal device is provided. The terminal device includes: a channel and interference measurement unit, used for using reference signal resources in a configured first set for channel measurement and interference measurement for a beam; and a calculating and reporting unit, used for calculating and reporting a SINR (Signal-to-Interference and Noise Ratio) based on results of the channel measurement and the interference measurement.

In a fifth aspect, a terminal device is provided. The terminal device includes: a processor and a memory, a computer program is stored in the memory, and when the computer program is executed by the processor, the processor performs actions of: using reference signal resources in a configured first set for channel measurement for a beam and reference signal resources in a configured second set for interference measurement for the beam; wherein the reference signal resources in the first set are associated by ordering with the reference signal resources in the second set; and calculating and reporting SINR (Signal-to-Interference and Noise Ratio) based on results of the channel measurement and the interference measurement.

In a sixth aspect, a terminal device is provided. The terminal device includes a processor and a memory, wherein a computer program is stored in the memory, and when the computer program is executed by the processor, the processor performs actions of: using reference signal resources in a configured first set for channel measurement and interference measurement for a beam; and calculating and reporting a SINR (Signal-to-Interference and Noise Ratio) based on results of the channel measurement and the interference measurement.

In a seventh aspect, a non-transitory computer-readable storage medium is provided. The non-transitory computer-readable storage medium includes a computer program that is executable by a processor to perform actions of the method for beam reporting in the first aspect.

In an eighth aspect, a non-transitory computer-readable storage medium is provided. The non-transitory computer-readable storage medium includes a computer program that is executable by a processor to perform actions of the method for beam reporting in the second aspect.

In a ninth aspect, a computer program product is provided. The computer program product contains instructions which, when being executed by a computer, causes the computer to implement the method for beam reporting of the first aspect or the second aspect.

According to the implementations of the present disclosure, a terminal device uses reference signal resources in a configured first set for channel measurement for a beam and reference signal resources in a configured second set for interference measurement for the beam, and the reference signal resources in the first set are associated by ordering with the reference signal resources in the second set, so that the terminal device could calculate and report SINR (Signal-to-Interference and Noise Ratio) based on results of the channel measurement and the interference measurement, then the terminal device and a network side device could select an appropriate beam for communication based on the SINR of beams.

DETAILED DESCRIPTION

Figure 1:
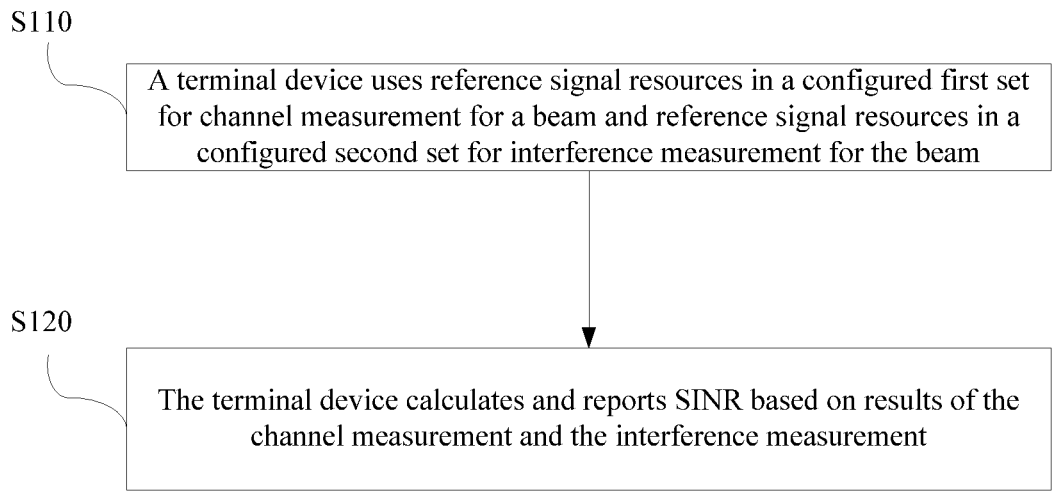
FIG. 1 is a schematic flowchart of a method for beam reporting according to an implementation of the present disclosure.

The technical solutions in the implementations of the present disclosure will be described clearly and completely in the following with reference to the drawings in the implementations of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a long term evolution (LTE) system, a LTE Frequency Division Duplex (FDD) system, a LTE Time Division Duplex (TDD) system, a Universal Mobile Telecommunication System (UMTS) or a Worldwide Interoperability for Microwave Access (WiMAX) communication system, a 5G system, or a new radio (NR) system.

In implementations of the present disclosure, the terms "network" and "system" are often used interchangeably, but those skilled in the art can understand their meaning. The terminal device involved in the implementations of the present disclosure may include various handheld devices with wireless communication functions, vehicle-mounted devices, wearable devices, computing devices or other processing devices connected to wireless modems, as well as various forms of user equipment (UE), mobile stations (MS), or mobile terminals, etc. For convenience of description, in implementations of the present disclosure, the above-mentioned devices are collectively referred to as terminal device. In the implementations of the present disclosure, applications are installed on the terminal device.

In implementations of the present disclosure, a network side device may be a device for communicating with the terminal device, and may be a core network control plane entity such as SMF (Session Management Function), PGW-C (Packet Data Network Gateway-Control Plane), and may also be a core network user plane entity such as UPF (User Plane Function), PGW-U (Packet Data Network Gateway-User Plane), an OTT (Over The Top) server, and may also be a network side device in a future 5G network, or a network side device in a future evolved public land mobile network (PLMN), etc.

For the communication between one terminal device such as UE and a network side device such as BS, the network side device and the terminal device need to determine which Tx and Rx beam are going to be used. The beams used by the BS device and the UE for communication might change when the UE moves. The following functions are defined to support such multi-beam-based operation.

Beam measurement and reporting: in this function, the UE can measure one or multiple Tx beams of the BS and then the UE can select the best Tx beam and report his selection to the BS. By measuring the Tx beams of the BS, the UE can also measure one or more different Rx beam and then select the best Rx beam for one particular Tx beam of the BS. In this function, the BS can also measure one or multiple Tx beam of the UE and then select the best Tx beam of the UE for a uplink transmission. To support measuring Tx beams of the BS, the BS can transmit multiple RS resources and then configures the UE to measure those RS resources. Then the UE can report the index of one or more selected RS resources that are selected based on some measure metric, for example, the L1-RSRP. To support measuring Tx beams of the UE used for uplink transmission, the BS can configure the UE to transmit one or more uplink RS resources (for example SRS resources) and then the BS can measure those RS resources. The BS can figure out which Tx beam of the UE is the best for uplink transmission based on measuring, for example, L1-RSRP of them.

Beam indication: for a downlink transmission, the BS can indicate the UE of which Tx beam of the BS is used to transmit so that the UE can use proper Rx beam to receive that downlink transmission. For PDCCH transmission, the BS can indicate the ID of one Tx beam of BS to the UE. For PDSCH transmission, the BS can use DCI in PDCCH to indicate the ID of one Tx beam that is used to transmit the corresponding PDSCH.

For an uplink transmission from the UE, the BS can also indicate the UE of which Tx beam of the UE shall be used. For example, for a PUCCH transmission, the UE shall use the Tx beam that is indicated by the BS through the configuration of spatial relation info. For a SRS transmission, the UE shall use the Tx beam that is indicated by the BS through the configuration of a spatial relation info. For a PUSCH transmission, the UE shall use the Tx beam that indicated by the information element contained in the scheduling DCI.

Beam switch: this function is used by the BS to switch the Tx beam used for a downlink or uplink transmission. This function is useful when the Tx beam used for transmission currently is out of date due to for example the movement of UE. When the BS finds the Tx beam currently used for downlink transmission is not good or the BS finds another Tx beam that is better than the current Tx beam, the BS can send signaling to the UE to inform the change of Tx beam. Similarly, the BS can switch the uplink Tx beam of the UE used to transmit some uplink transmission.

In a communication system, such as NR (new radio) system, DL signals can include control signaling conveying DL control information (DCI) through PDCCH channel, data signals conveying information packet through PDSCH channel and some types of reference signals. The DCI can indicate the information of how the PDSCH is transmitted, including for example the resource allocation and transmission parameters for the PDSCH. The BS can transmit one or more types of reference signals for different purposes, including DM-RS that is transmitted along with a PDSCH and can be used by the UE to demodulate the PDSCH, CSI-RS that can be used by the UE to measure BS's Tx beam or CSI of the downlink channel between the BS and the UE, PT-RS that is also transmitted along with a PDSCH and can be used by the UE to estimate the phase noise caused by imperfection in RF (radio frequency) part in the transmitter and receiver and then compensate it when decoding PDSCH. In NR, DL resource allocation for PDCCH, PDSCH and reference signals is performed in a unit of OFDM symbols and a group of PRBs. Each PRB contains a few REs, for example 12, in frequency domain. A transmission BW of one downlink transmission consists of frequency resource unit called as RBs and each RB consists of a few, for example 12, subcarriers, or REs.

The UL signals transmitted by the UE to the BS can include data signals conveying data packet through PUSCH channel, uplink control signals conveying UL control information (UCI) which can be transmitted in PUSCH or PUCCH channel, and UL reference signals. The UCI can carry SR (schedule request) used by the UE to request uplink transmission resource, HARQ-ACK feedback for a PDSCH transmission or CSI report. The UE can transmit one or more types of uplink reference signals for different purposes, including DM-RS that is transmitted along with a PUSCH transmission and can be used by the BS to demodulate the PUSCH, PT-RS that is also transmitted along with a PUSCH and can be used by the BS to estimate the phase noise caused by imperfection in RF parts and the BS then can compensate it when decoding PUSCH, and SRS signals that are used by the BS to measure one or more UE Tx beams or CSI of the uplink channel between the UE and the BS. Similarly, UL resource allocation for PUSCH, PUCCH and UL reference signal is also performed in a unit of symbols and a group of PRBs.

FIG. 1 is a schematic flowchart of a method for beam reporting according to an implementation of the present disclosure. As shown in FIG. 1, the method 100 includes S110 and S120.

In S110, a terminal device uses reference signal resources in a configured first set for channel measurement for a beam and reference signal resources in a configured second set for interference measurement for the beam; wherein the reference signal resources in the first set are associated by ordering with the reference signal resources in the second set.

In S120, the terminal device calculates and reports SINR based on results of the channel measurement and the interference measurement.

Herein, the reference signal resources in the first set are CSI-RS (Channel State Information-Reference Signal) resources and/or SS (Synchronization Signal)/PBCH (Physical Broadcast Channel) resources, the reference signal resources in the second set are CSI-RS resources and/or NZP (Non-Zero-Power) CSI-RS and/or CSI-IM (Channel State Information-Interference Measurement) resources.

In an example, the SINR is L1 (Level 1)-SINR.

In an example, the reference signal resources in the first set are associated by ordering with the reference signal resources in the second set in the following way:

the reference signal resources in the first set and the reference signal resources in the second set are configured in sequence; and a reference signal resource in the first set is associated with one or more reference signal resources in the second set according to a position of the reference signal resource in the first set and positions of the one or more reference signal resources in the second set.

The ordering can be implemented in many ways, such as the reference signal resources can be ordered in a line or circle or other shapes. The association can be done based on the positions of the reference signal resources in the first set and the second set.

Each reference signal resource can have a reference number, and the association can be done by the association of the reference numbers.

Figure 2:
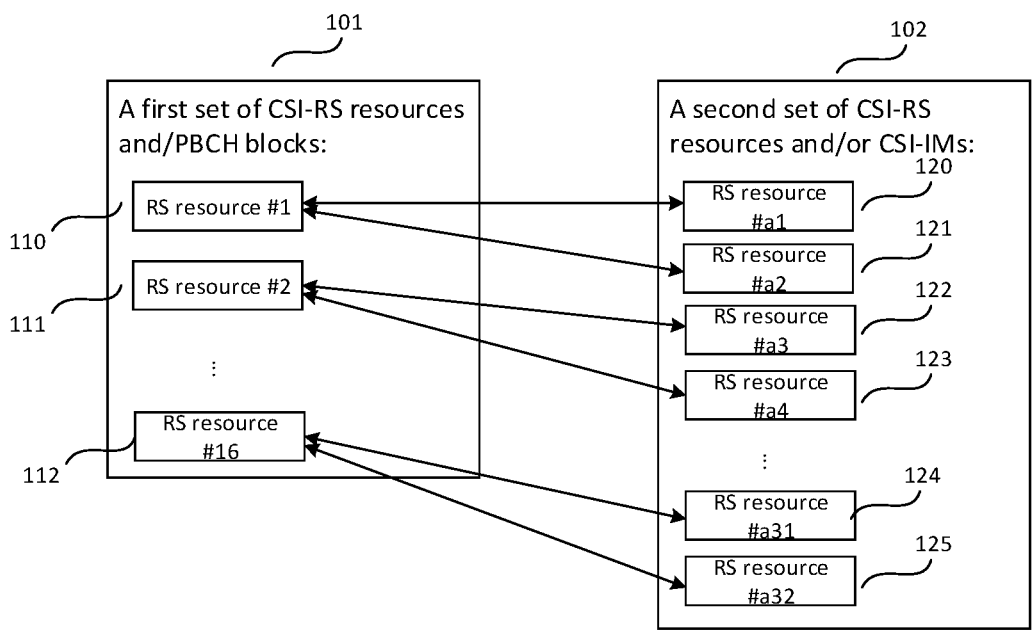
FIG. 2 illustrates an example of the association between the reference signal resources in the first set and the reference signal resources in the second set.

In an example, the first set contains $N_1$ reference signal resources, the second set contains $N_1*M_1$ reference signal resources, and a $n_{th}$ reference signal resource in the first set is associated with a subset of $\{((n-1)\times M_1+1)_{th}, ((n-1)\times M_1+2)_{th}, \ldots, (n\times M_1)_{th}\}$ entry of reference signal resources in the second set, wherein n, $N_1$ and $M_1$ are natural numbers. FIG. 2 illustrates an example of the association between the reference signal resources in the first set and the reference signal resources in the second set.

Particularly, when $M_1=1$, that is, the terminal device can assume that each reference signal resource in the first set is resource-wise associated with a reference signal resource in the second set by the ordering of the reference signal resources in the first set and the reference signal resources in the second set for each L1-SINR calculation. In other word, the terminal device can assume the n-th (n=1, 2, ..., $N_1$) entry in the first set is associated with the n-th entry in the second set for each L1-SINR calculation.

As shown in FIG. 2, the first set 101 includes RS resource #1 to RS resource #16, the second set 102 includes RS resource #a1 to RS resource #a32. Reference numbers 110-112 and 120-125 are used to indicate the shown RS resources.

In the example shown in FIG. 2, the terminal device is configured with the first set 101, with $N_1=16$ reference signal (RS) resources such as CSI-RS resource or SS/PBCH block, and the terminal device is further configured with the second set 102, with 32, that is, $N_1=16$, $M_1=2$, RS resources such as CSI-RS resource and/or NZP CSI-RS and/or CSI-IM resources. In the first set 101, {RS resource #1 110, RS resource #2 111, ..., RS resource #16 112} are configured in ordering. In the second set 102, {RS resource #a1 120, RS resource #a2 121, ..., RS resource #a32 125} are configured in ordering.

In such a configuration, the terminal device could use one or more RS resources in the first set and the associated RS resources in the second set for calculation of one SINR, and the terminal device could calculate one or more SINRs by selecting different RS resources in the first set and the associated RS resources in the second set.

For example, to measure the first L1-SINR, the terminal device can use the RS resource #1 110 in the first set 101, and when the RS resource #1 110 in the first set 101 is associated with RS resource #a1 120 and RS resource #a2 121, the terminal device can use RS resource #1 110 to measure the channel for L1-SINR calculation and RS resource #a1 120 or RS resource #a2 121 or both RS resource #a1 120 and RS resource #a2 121 to measure the interference for L1-SINR calculation.

For measurement of the second L1-SINR, the terminal device can assume the RS resource #2 111 in the first set 101 is associated with RS resource #a3 122 and RS resource #a4 123 for the measurement of one L1-SINR. The terminal device can use RS resource #2 111 to measure the channel for L1-SINR calculation and the terminal device can be requested to use RS resource #a3 122 or RS resource #a3 123 or both RS resource #a3 122 and RS resource #a4 123 to measure the interference for L1-SINR calculation.

For measurement of the third L1-SINR, the terminal device can assume the RS resource #16 112 in a first set 101 is associated with RS resource #a31 124 and RS resource #a32 125 for the measurement of one L1-SINR. The terminal device can be requested to use RS resource #16 112 to measure the channel for L1-SINR calculation and the terminal device can be requested to use RS resource #a31 124 or RS resource #a32 125 or both RS resource #a31 124 and RS resource #a32 125 to measure the interference for L1-SINR calculation.

In the above three measurements of L1-SINRs, one RS resource in the first set is used for each measurement. In other measurements, several RS resources in the first set can be used for each L1-SINR measurement, or different number of RS resources in the first set can be used for different L1-SINR measurement.

In an implementation, different RS resource in the first set can be associated with different number of RS resources in the second set. For example, RS resource #1 is associated with two RS resources in the second set, but RS resource #2 is associated with three RS resources in the second set.

In an implementation, for each RS resource in the first set, the associated RS resources in the second set have the same frequency bandwidth. Alternatively, each RS resource in the second set has the same frequency bandwidth.

In an implementation, when QCL (Quasi Co-Located)-Type D configuration is used during receiving the reference signal resources in the first set for the channel measurement, receiving the reference signal resources in the second set for the interference measurement by applying the QCL-Type D configuration of the reference signal resources in the first set. That is, the same QCL-Type D configuration is used for the receiving the reference signal resources in the first set for the channel measurement and the reference signal resources in the second set for the interference measurement, and the QCL-Type D configuration of the reference signal resources in the second set is ignored.

In an implementation, to calculate one L1-SINR, the UE applies proper QCL assumption to receive one CSI-RS resource or SS/PBCH block configured in the first set for channel measurement and to receive the associated CSI-RS resource or CSI-IM resource configured in the second set for interference measurement.

In an implementation, when QCL-Type D configuration is configured to the CSI-RS resource or SS/PBCH block in the first set, the terminal device receives associated CSI-RS resource in the second set for interference measurement by taking that the associated CSI-RS resource is quasi co-located to a RS (Reference Signal), which is the RS with QCL-Type D configuration in a TCI (Transmission Configuration Index) state configured to the CSI-RS resource in the first set or the RS with respect to QCL configuration for the SS/PBCH block in the first set.

In one example, when the associated CSI-RS resource in the second set is configured with QCL-type D and the terminal device is not able to receive both the CSI-RS resource or SS/PBCH block configured in the first set and the associated CSI-RS resource in the second set simultaneously, the terminal device can detect the associated CSI-RS resource in the second set by assuming or taking that the associated CSI-RS resource is quasi co-located to a RS with respect to the 'QCL-Type D', which is the RS with index with 'QCL-Type D' configuration for the corresponding TCI states configured to the CSI-RS resource or the RS with respect to QCL assumption for the SS/PBCH block in the first set.

In an implementation, when QCL-Type D configuration is configured to the CSI-RS resource in the first set, the terminal device receives an associated CSI-IM resource in the second set for interference measurement by taking or assuming that the associated CSI-IM resource is quasi co-located to a RS, which is the RS with QCL-Type D configuration in a TCI state configured to the CSI-RS resource in the first set.

In an implementation, when QCL-Type D configuration is configured to a SS/PBCH block configured in the first set, the terminal device receives associated CSI-IM resource in the second set for interference measurement by applying the QCL configuration of the SS/PBCH block to receive the associated CSI-IM in the second set.

In an implementation, the SINR is a channel measurement result divided by an interference measurement result, or a linear average of channel measurement results divided by a linear average of interference measurement results. Herein, the terminal could perform only one channel measurement and one interference measurement, and the SINR could be the one ratio of the value of the channel measurement result over the one interference measurement results. There may also a plurality of channel measurement results or interference measurement results, and the linear average is used for the plurality of channel measurement results or interference measurement results to get the SINR.

In an implementation, the SINR is a linear average over power contribution of resource elements carrying the reference signal resources in the first set divided by a linear average of noise and interference power contribution over resource elements allocated to the reference signal resources in the second set. Herein, the channel measurement result includes the power contribution, and the interference measurement results include the interference power contribution.

In an implementation, the SINR is equal to Ps/Pi, wherein Ps is a linear average power over power contribution of resource elements carrying signals of the reference signal resources, Pi is a sum of linear average power over power contribution of resource elements carrying signals of each of the reference signal resources in the second set.

In an implementation, the SINR is equal to Ps/Pi, wherein Ps is a linear average power over power contribution of resource elements carrying signals of the reference signal resources, Pi is a linear average power over power contribution of resource elements carrying signals of one or more of the reference signal resources in the second set.

For example, if the number of CSI-RS resources and/or SS/PBCH blocks configured in the first set for channel measurement is equal to the number of CSI-RS resources and/or CSI-IM resources configured in the second set for interference measurement, for the calculation of one L1-SINR, the terminal device can be requested to calculate the L1-SINR=Ps/Pi, where Ps is the linear average power over the power contribution of resource elements carrying the signals of one CSI-RS resource or SS/PBCH block and Pi is the linear average power over the power contribution of resource elements carrying signals of the associated CSI-RS resource or CSI-IM resource.

In an example, the terminal device can be configured with the first set of reference signal resources, which contains $N_1$ CSI-RS resources and/or SS/PBCH blocks for channel measurement, and the second set of reference signal resources, which can contain $N_1 \times M_1$ CSI-RS resources or CSI-IM resources for interference measurement. When the value of $M_1$ is larger than 1, one CSI-RS resource or SS/PBCH block in a first set is associated with multiple, i.e., $M_1$, CSI-RS resources or CSI-IM resources for L1-SINR calculation. For the calculation of one L1-SINR, the terminal device can be requested to calculate the L1-SINR=Ps/Pi, where Ps is the linear average power over the power contribution of resource elements carrying the signals of one CSI-RS resource or SS/PBCH block, and Pi is the sum of linear average power over the power contribution of resource elements carrying signals of each CSI-RS resource or CSI-IM resource in the second set, which are associated with the CSI-RS resource or SS/PBCH block.

In an example, the terminal device can be configured with the first set of reference signal resources, which contains $N_1$ CSI-RS resources and/or SS/PBCH blocks for channel measurement, and the second set of reference signal resources, which can contain $N_1 \times M_1$ CSI-RS resources or CSI-IM resources for interference measurement. When the value of $M_1$ is larger than 1, one CSI-RS resource or SS/PBCH block in the first set is associated with multiple, i.e., $M_1$, CSI-RS resources or CSI-IM resources for L1-SINR calculation. For the calculation of one L1-SINR, the terminal device can be requested to calculate the L1-SINR=Ps/Pi, where Ps is the linear average power over the power contribution of resource elements carrying the signals of one CSI-RS resource or SS/PBCH block and Pi is the linear average power over the power contribution of resource elements carrying signals of one CSI-RS resource or CSI-IM resources among the CSI-RS resources or CSI-IM resources in the second set, which are associated with the CSI-RS resource or SS/PBCH block in the first set.

In an implementation, not only the SINR is reported, but also other information can be reported. Here the other information includes an indicator indicating the reference signal resources in the first set, and/or information of value of L1-RSRP calculated over the indicated reference signal resources in the first set, and/or another indicator indicating the reference signal resources in the second set is further reported.

For example, the terminal device can be configured to report one or more of the following measurements on CSI-RS resources and/or SS/PBCH blocks with respect to the reference signal resource configuration:

Alt 1: the terminal device can be requested to report one or more set of the following information: an indicator that indicates one CSI-RS resource or SS/PBCH configured in the first set for channel measurement, information of the value of L1-SINR calculated over the indicated RS resource.

Alt 2: the terminal device can be requested to report one or more set of the following information: an indicator that indicates one CSI-RS resource or SS/PBCH configured in the first set for channel measurement, information of L1-SINR calculated over the indicated RS resource, and information of value of L1-RSRP calculated over the indicated CSI-RS resource or SS/PBCH block configured in the first set.

Alt 3: the terminal device can be requested to report one or more set of the following information: an indicator that indicates one CSI-RS resource or CSI-IM resource configured in the second set for interference measurement for L1-SINR computation, and information of L1-SINR that is calculated with the indicated CSI-RS resource or CSI-IM resource in the second set and the associated CSI-RS resource in the first set for channel measurement for the L1-SINR computation.

Alt 4: the terminal device can be requested to report one or more sets of the following information: an indicator that indicates one CSI-RS resource or CSI-IM resource configured in the second set for interference measurement for L1-SINR computation, information of L1-SINR that is calculated with the indicated CSI-RS resource or CSI-IM resource in the second set and the associated CSI-RS resource in the first set for channel measurement for the L1-SINR computation, and information of value of L1-RSRP calculated over the CSI-RS resource or SS/PBCH block configured in the first set, which is associated with the CSI-RS resource or CSI-IM resource that is indicated by the reported indicator.

Alt 5: the terminal device can be requested to report one or more set of the following information: the first indicator that indicates one CSI-RS resource or SS/PBCH block configured in the first set for channel measurement for L1-SINR computation, the second indicator that indicates one CSI-RS resource or CSI-IM resource configured in the second set for interference measurement for L1-SINR computation, and information of L1-SINR that is calculated with the indicated CSI-RS resource or CSI-IM resource in the second set and the indicated CSI-RS resource in the first set for channel measurement for the L1-SINR computation. Here, for the second indicator, the indicated CSI-RS resource or CSI-IM resource here must be one among those RS resource associated with the CSI-RS resource or SS/PBCH block indicated by the first indicator, and compared to other method, the bit-width for the second indicator can be smaller than the indicator used to indicate RS resource configured in the second set.

Alt 6: the terminal device can be requested to report one or more set of the following information: the first indicator that indicates one CSI-RS resource or SS/PBCH block configured in the first set for channel measurement for L1-SINR computation, the second indicator that indicates one CSI-RS resource or CSI-IM resource configured in the second set for interference measurement for L1-SINR computation, information of L1-SINR that is calculated with the indicated CSI-RS resource or CSI-IM resource in the second set and the indicated CSI-RS resource in the first set for channel measurement for the L1-SINR computation, and information of L1-SINR that is calculated with the indicated CSI-RS resource in the first set for channel measurement. Here, for the second indicator, the indicated CSI-RS resource or CSI-IM resource here must be one among those RS resource associated with the CSI-RS resource or SS/PBCH block indicated by the first indicator, and compared to other method, the bit-width for a second indicator can be smaller than the indicator used to indicate RS resource configured in the second set.

Here Alt 1 to Alt 6 refers to options schemes 1 to 6.

Here the indicator that indicates one CSI-RS resource configured in the first set for channel measurement can be called CRI, and the indicator that indicates one SS/PBCH block configured in the first set for channel measurement can be called SSBRI. The indicator that indicates one CSI-RS resources or one CSI-IM resource configured in the second set for interference measurement can be called IMR.

In an implementation, the terminal device can be configured with the first set of $N_1(\geq 1)$ CSI-RS resources and/or SS/PBCH blocks for channel measurement for L1-SINR computation and the second set of $N_1 \times M_1$ (for example $M_1=1, 2, 4, 8$) CSI-RS resources and/or CSI-IM resources for interference measurement for L1-SINR computation. The terminal device can assume the n-th ($n=1, 2, \ldots, N_1$) entry in the first set is associated the subset of $\{((n-1) \times M_1+1)$-th, $((n-1) \times M_1+2)$-th, $\ldots, (n \times M_1)$-th$\}$ entry in the second set for each L1-SINR calculation. The terminal device can be requested to report N ($\geq 1$) set of selected RS resources and corresponding L1-SINR information as one or more of the following examples.

In the first example, $N_1=2$, the terminal device can be configured to report the following reporting instance:

Alt1-1: $\{CRI_1, L1\text{-}SINR_1\}, \{CRI_2, L1\text{-}SINR_2\}$, and/or
Alt 1-2: $\{CRI_1, L1\text{-}SINR_1\}, \{CRI_2, \text{differential } L1\text{-}SINR_2\}$.

Here $CRI_1$ indicates one CSI-RS resource in the first set and $L1\text{-}SINR_1$ is the L1-SINR computed based on the CSI-RS resource indicated by $CRI_1$ and the CSI-RS resource(s) or CSI-IM resources (s) configured in the second set, which is associated with the CSI-RS indicated by $CRI_1$. $CRI_2$ indicates one CSI-RS resource in the first set and $L1\text{-}SINR_2$ is the L1-SINR computed based on the CSI-RS resource indicated by $CRI_2$ and the CSI-RS resource(s) or CSI-IM resources (s) configured in the second set, which is associated with the CSI-RS indicated by $CRI_2$. Differential $L1\text{-}SINR_2$ is the differential L1-SINR computed from the CSI-RS resource indicated by $CRI_2$ with a reference to the largest L1-SINR reported in the same reporting instance (i.e., $L1\text{-}SINR_1$ in this reporting instance).

In the second example, $N_1=2$, the terminal device can be configured to report the following reporting instance:

Alt 2-1: $\{CRI_1, IMR_1, L1\text{-}SINR_1\}$, $\{CRI_2, IMR_2, L1\text{-}SINR_2\}$, and/or Alt 2-2: $\{CRI', IMR_1, L1\text{-}SINR_1\}$, $\{CRI_2, IMR_2, \text{differential } L1\text{-}SINR_2\}$.

Here $CRI_1$ indicates one CSI-RS resource in the first set and $IMR_1$ indicates one CSI-RS resource or CSI-IM resource among the subset of $N_1*M_1$ CSI-RS resources and/or CSI-IM resources configured in the second set, which are associated with the CSI-RS resource indicated by $CRI_1$. For example, $CRI_1=k\geq 0$ indicates the CSI-RS resource configured as the (k+1)-th entry in a first set. The subset of $\{(k\times M_1+1)\text{-th}, (k\times M_1+2)\text{-th}, ((k+1)\times M_1)\text{-th}\}$ entries configured in a second set is associated with the CSI-RS indicated by $CRI_1=k$. Then the $IMR_1$ can use $\lceil \log_2 M_1 \rceil$ bits and its value indicates one CSI-RS resource or CSI-IM resource in the subset of $\{(k\times M_1+1)\text{-th}, (k\times M_1+2)\text{-th}, ((k+1)\times M_1)\text{-th}\}$ entries configured in the second set. The $IMR_1$ being $l=(l=0, 1, 2, \ldots, M_1-1)$ indicates the (l+1)-th entry in the subset of $\{(k\times M_1+1)\text{-th}, (k\times M_1+2)\text{-th}, \ldots, ((k+1)\times M_1)\text{-th}\}$ entries configured in the second set.

Here $CRI_2$ indicates one CSI-RS resource in the first set and $IMR_2$ indicates one CSI-RS resource or CSI-IM resource among the subset of $N_1*M_1$ CSI-RS resources and/or CSI-IM resources configured in the second set, which are associated with the CSI-RS resource indicated by $CRI_2$.

The $L1\text{-}SINR_1$ is the L1-SINR computed based on the CSI-RS resource indicated by $CRI_1$ and the CSI-RS resource(s) or CSI-IM resources (s) indicated by $IMR_1$ configured in the second set. $L1\text{-}SINR_2$ is the L1-SINR computed based on the CSI-RS resource indicated by $CRI_2$ and the CSI-RS resource(s) or CSI-IM resources (s) indicated by $IMR_2$ configured in the second set.

In the third example, $N_1=2$, the terminal device can be configured to report the following in one reporting instance:

Alt 3-1: $\{IMR_1, L1\text{-}SINR_1\}$, $\{IMR_2, L1\text{-}SINR_2\}$, and/or Alt 3-2: $\{IMR_1, L1\text{-}SINR_1\}$, $\{IMR_2, \text{differential } L1\text{-}SINR_2\}$.

Here $IMR_1$ indicates one CSI-RS resource or CSI-IM resource configured in the second set, $L1\text{-}SINR_1$ is the L1-SINR computed based on the interference measurement over CSI-RS resource or CSI-IM configured in the second set indicated by $IMR_1$ and the CSI-RS resource(s) configured in the first set, which is associated with the CSI-RS or CSI-IM indicated by $IMR_1$.

$IMR_2$ indicates one CSI-RS resource or CSI-IM resource configured in the second set and $L1\text{-}SINR_2$ is the L1-SINR computed based on the interference measurement over CSI-RS resource or CSI-IM configured in the second set indicated by $IMR_2$ and the channel measurement over the CSI-RS resource(s) configured in the first set, which is associated with the CSI-RS or CSI-IM indicated by $IMR_2$.

Here the $IMR_1$ and $IMR_2$ can use a value with $\lceil \log_2(N_1\times M_1)\rceil$ bits. Each of IMR here can implicitly indicate one CSI-RS resource in the first set and one CSI-RS resource/ CSI-IM resource in the second set.

Differential $L1\text{-}SINR_2$ is the differential L1-SINR computed over the interference measurement of the CSI-RS resource or CSI-IM indicated by $IMR_2$ and the channel measurement over the CSI-RS resource(s) configured in the first set, which is associated with the CSI-RS or CSI-IM indicated by $IMR_2$, with a reference to the largest L1-SINR reported in the same reporting instance (i.e., $L1\text{-}SINR_1$ in this reporting instance).

In the fourth example, $N_1=2$, the terminal device can be configured to report the following in one reporting instance:

Alt4-1: $\{CRI_1, L1\text{-}RSRP_1, L1\text{-}SINR_1\}$, $\{CRI_2, \text{differential } L1\text{-}RSRP_2, L1\text{-}SINR_2\}$, and/or Alt4-2: $\{CRI_1, L1\text{-}RSRP_1, L1\text{-}SINR_1\}$, $\{CRI_2, L1\text{-}RSRP_2, \text{differential } L1\text{-}SINR_2\}$, and/or Alt4-3: $\{CRI_1, L1\text{-}RSRP_1, L1\text{-}RSRP_1\}$, $\{CRI_2, L1\text{-}RSRP_2, L1\text{-}SINR_2\}$.

For the description of $CRI_1, CRI_2, L1\text{-}SINR_1, L1\text{-}SINR_2$, please refer to the first and second example.

$L1\text{-}RSRP_1$ and $L2\text{-}RSRP_2$ are the L1-RSRP measurement calculated from the CSI-RS resource indicated by $CRI_1$ and $CRI_2$, respectively.

In the fifth example, $N_1=2$, the terminal device can be configured to report the following in one reporting instance:

Alt5-1: $\{CRI_1, IMR_1, L1\text{-}RSRP_1, L1\text{-}SINR_1\}$, $\{CRI_2, IMR_2, \text{differential } L1\text{-}RSRP_2, L1\text{-}SINR_2\}$, and/or Alt5-2: $\{CRI_1, IMR_1, L1\text{-}RSRP_1, L1\text{-}SINR_1\}$, $\{CRI_2, IMR_2, L1\text{-}RSRP_2, L1\text{-}SINR_2\}$, and/or Alt5-3: $\{CRI_1, IMR_1, L1\text{-}RSRP_1, L1\text{-}SINR_1\}$, $\{CRI_2, IMR_2, L1\text{-}RSRP_2, \text{differential } L1\text{-}SINR_2\}$.

Here $IMR_1$ indicates one CSI-RS resource or CSI-IM resource among the subset of $N_1*M_1$ CSI-RS resources and/or CSI-IM resources configured in the second set, which are associated with the CSI-RS resource indicated by $CRI_1$. $IMR_2$ indicates one CSI-RS resource or CSI-IM resource among the subset of $N_1*M_1$ CSI-RS resources and/or CSI-IM resources configured in the second set, which are associated with the CSI-RS resource indicated by $CRI_2$.

Here the $IMR_1$ and $IMR_2$ can use a value with $\lceil \log_2(M_1)\rceil$ bits.

In the sixth example, $N_1=2$, the terminal device can be configured to report the following in one reporting instance:

Alt6-1: $\{IMR_1, L1\text{-}RSRP_1, L1\text{-}SINR_1\}$, $\{IMR_2, \text{differential } L1\text{-}RSRP_2, L1\text{-}SINR_2\}$, and/or Alt6-2: $\{IMR_1, L1\text{-}RSRP_1, L1\text{-}SINR_1\}$, $\{IMR_2, L1\text{-}RSRP_2, \text{differential } L1\text{-}SINR_2\}$, and/or Alt6-3: $\{IMR_1, L1\text{-}RSRP_1, L1\text{-}SINR_1\}$, $\{IMR_2, L1\text{-}RSRP_2, L1\text{-}SINR_2\}$.

Here the $IMR_1$ and $IMR_2$ can use a value with $\lceil \log_2(N_1\times M_1)\rceil$ bits. $IMR_1=l (=0, 1, 2, \ldots, N_1\times M_1-1)$ can indicate the (l+1)-th entry configured in the second set.

In an implementation, when the higher layer parameter repetition for the CSI-RS resources configured in the first set, i.e., the CSI-RS resources configured for channel measurement for L1-SINR computation, is set to 'on', the terminal device can still report the information of CRI/IMR/ L1-SINR according to the above proposed implementations or examples.

In an implementation, the interference measurement is performed by using the reference signal resources in the second set and a reference signal resource in a configured third set. Here the third set could include one reference signal resource, and when TCI state configured to the reference signal resource in the first set contains 'QCL-Type D', the reference signal resource in the third set is periodic or semi-persistent. The interference measurement results of the second set and the third set could be used by average, different weights or other ways for the SINR, which is not limited here.

According to the implementations of the present disclosure, a terminal device uses reference signal resources in a configured first set for channel measurement for a beam and reference signal resources in a configured second set for interference measurement for the beam, and the reference signal resources in the first set are associated by ordering with the reference signal resources in the second set, so that the terminal device could calculate and report SINR based on results of the channel measurement and the interference measurement, then the terminal device and a network side device could select an appropriate beam for communication based on the SINR of beams.

Figure 3:
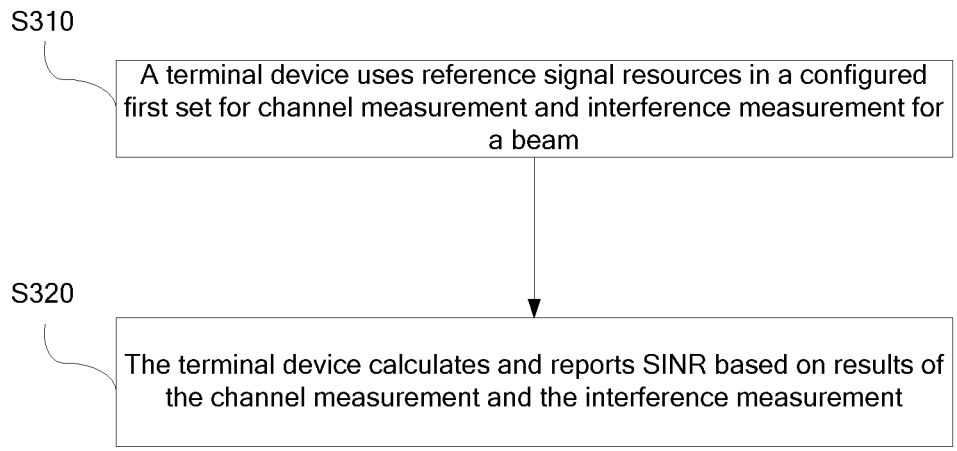
FIG. 3 is another schematic flowchart of a method for beam reporting according to an implementation of the present disclosure.

FIG. 3 is another schematic flowchart of a method for beam reporting according to an implementation of the present disclosure. As shown in FIG. 3, the method 300 includes S310 and S320.

In S310, a terminal device uses reference signal resources in a configured first set for channel measurement and interference measurement for a beam.

In S320, the terminal device calculates and reports a SINR based on results of the channel measurement and the interference measurement.

In an implementation, a plurality of SINRs are calculated and reported based on the channel measurement and the interference measurement with a plurality of reference signal resources.

In an implementation, a differential SINR between different SINRs is calculated and reported.

In an implementation, a RSRP and/or differential RSRP is calculated and reported.

In an implementation, the terminal device is configured with the first set of $N_1$ CSI-RS resources for channel measurement and interference measurement for L1-SINR computation. Then the terminal device can be requested to report $N(\geq 1)$ set of information on selected CSI-RS resource and corresponding L1-SINR measurement as one or more of the following examples.

In the first example, the terminal device can be configured with reporting with N=2 to report the following in one reporting instance: $\{CRI_1, L1\text{-}SINR_1\}$, $\{CRI_2, L1\text{-}SINR_2\}$, where $CRI_1$ indicates one CSI-RS resource in a first set and $L1\text{-}SINR_1$ is the L1-SINR computed from the CSI-RS resource indicated by $CRI_1$; $CRI_2$ indicates one CSI-RS resource in a first set and $L1\text{-}SINR_2$ is the L1-SINR computed from the CSI-RS resource indicated by $CRI_2$.

In the second example, the terminal device can be configured with reporting with N=2 to report the following in one reporting instance: $\{CRI_1, L1\text{-}SINR_1\}$, $\{CRI_2, \text{differential } L1\text{-}SINR_2\}$, where $CRI_1$ indicates one CSI-RS resource in a first set and $L1\text{-}SINR_1$ is the L1-SINR computed from the CSI-RS resource indicated by $CRI_1$; $CRI_2$ indicates one CSI-RS resource in a first set and differential $L1\text{-}SINR_2$ is the differential L1-SINR computed from the CSI-RS resource indicated by $CRI_2$ with a reference to the largest L1-SINR reported in the same reporting instance (i.e., $L1\text{-}SINR_1$ in this reporting instance).

In the third example, the terminal device can be configured with reporting with N=2 to report the following in one reporting instance: $\{CRI_1, L1\text{-}RSRP_1, L1\text{-}SINR_1\}$, $\{CRI_2, \text{differential } L1\text{-}RSRP_2, L1\text{-}SINR_2\}$, where $CRI_1$ indicates one CSI-RS resource in a first set, $L1\text{-}RSRP_1$ and $L1\text{-}SINR_1$ are the L1-RSRP and L1-SINR computed from the CSI-RS resource indicated by $CRI_1$, respectively; $CRI_2$ indicates one CSI-RS resource in a first set and differential $L1\text{-}RSRP_2$ is the differential L1-RSRP computed from the CSI-RS resource indicated by $CRI_2$ with a reference to the largest L1-RSRP reported in the same reporting instance (i.e., $L1\text{-}RSRP_1$ in this reporting instance), and $L1\text{-}SINR_2$ is the L1-SINR computed from the CSI-RS resource indicated by $CRI_2$.

In the fourth example, the terminal device can be configured with reporting with N=2 to report the following in one reporting instance: $\{CRI_1, L1\text{-}RSRP_1, L1\text{-}SINR_1\}$, $\{CRI_2, L1\text{-}RSRP_2, \text{differential } L1\text{-}SINR_2\}$, where $CRI_1$ indicates one CSI-RS resource in a first set, $L1\text{-}RSRP_1$ and $L1\text{-}SINR_1$ are the L1-RSRP and L1-SINR computed from the CSI-RS resource indicated by $CRI_1$, respectively; $CRI_2$ indicates one CSI-RS resource in a first set and differential L1-SINR is the differential L1-SINR computed from the CSI-RS resource indicated by $CRI_2$ with a reference to the largest L1-SINR reported in the same reporting instance (i.e., $L1\text{-}SINR_1$ in this reporting instance), and $L1\text{-}RSRP_2$ is the L1-RSRP computed from the CSI-RS resource indicated by $CRI_2$.

In the fifth example, the terminal device can be configured with reporting with N=2 to report the following in one reporting instance: $\{CRI_1, L1\text{-}RSRP_1, L1\text{-}SINR_1\}$, $\{CRI_2, L1\text{-}RSRP_2, L1\text{-}SINR_2\}$, where $CRI_1$ indicates one CSI-RS resource in a first set, $L1\text{-}RSRP_1$ and $L1\text{-}SINR_1$ are the L1-RSRP and L1-SINR computed from the CSI-RS resource indicated by $CRI_1$, respectively; $CRI_2$ indicates one CSI-RS resource in a first set and L1-SINR is the L1-SINR computed from the CSI-RS resource indicated by $CRI_2$ and $L1\text{-}RSRP_2$ is the L1-RSRP computed from the CSI-RS resource indicated by $CRI_2$.

An example of L1-SINR values is shown in Table 1a, where 1 dB step-size is used for 5-bit L1-SINR value.

TABLE 1a

| L1-RSRP reporting index | Value of L1-SINR |
| --- | --- |
| 00000 | L1-SINR < 0 dB |
| 00001 | 0 dB ≤ L1-SINR < 1 dB |
| 00010 | 1 dB ≤ L1-SINR < 2 dB |
| ... | ... |
| 11110 | 30 dB ≤ L1-SINR < 31 dB |
| 11111 | 31 dB ≤ L1-SINR |

An example of L1-SINR values is shown in Table 1b, where 2 dB step-size is used for 4-bit L1-SINR value.

TABLE 1b

| L1-RSRP reporting index | Value of L1-SINR |
| --- | --- |
| 0000 | L1-SINR < 0 dB |
| 0001 | 0 dB ≤ L1-SINR < 2 dB |
| 0010 | 2 dB ≤ L1-SINR < 4 dB |
| ... | ... |
| 1110 | 26 dB ≤ L1-SINR < 28 dB |
| 1111 | 28 dB ≤ L1-SINR |

An example of L1-SINR values is shown in Table 1c, where 3 dB step-size is used for 4-bit L1-SINR value.

TABLE 1c

| L1-RSRP reporting index | Value of L1-SINR |
| --- | --- |
| 000 | L1-SINR < 3 dB |
| 001 | 3 dB ≤ L1-SINR < 6 dB |
| 010 | 6 dB ≤ L1-SINR < 9 dB |
| ... | ... |
| 110 | 18 dB ≤ L1-SINR < 21 dB |
| 111 | 21 dB ≤ L1-SINR |

The reported differential L1-SINR is defined as one L1-SINR subtract a reference L1-SINR. Examples of differential L1-SINR values are shown in Table 2a and Table 2b respectively, where 2 dB step-size is used for 3-bit L1-SINR value.

TABLE 2a

| Differential L1-RSRP reporting index | Value of differential L1-SINR |
| --- | --- |
| 000 | −2 dB < differential L1-SINR ≤ 0 dB |
| 001 | −4 dB < differential L1-SINR ≤ −2 dB |
| 010 | −6 dB < differential L1-SINR ≤ −4 dB |
| ... | ... |
| 110 | −14 dB < differential L1-SINR ≤ −12 dB |
| 111 | differential L1-SINR ≤ −14 dB |

TABLE 2B

| Differential L1-RSRP reporting index | Value of differential L1-SINR |
| --- | --- |
| 000 | Special value that indicates the L1-SINR to calculate differential L1-SINR is less some special value, for example 0 dB. |
| 001 | −2 dB < differential L1-SINR ≤ 0 dB |
| 010 | −4 dB < differential L1-SINR ≤ −2 dB |
| 011 | −6 dB < differential L1-SINR ≤ −4 dB |
| 100 | −8 dB < differential L1-SINR ≤ −6 dB |
| 101 | −10 dB < differential L1-SINR ≤ −8 dB |
| 110 | differential L1-SINR ≤ −10 dB |
| 111 | Special value that indicates the L1-SINR to calculate differential L1-SINR is less some special value, for example 31 dB. |

According to the implementations of the present disclosure, a terminal device uses reference signal resources in a configured first set for channel measurement and interference measurement for a beam, so that the terminal device could calculate and report SINR based on results of the channel measurement and the interference measurement, then the terminal device and a network side device could select an appropriate beam for communication based on the SINR of beams.

Figure 4:
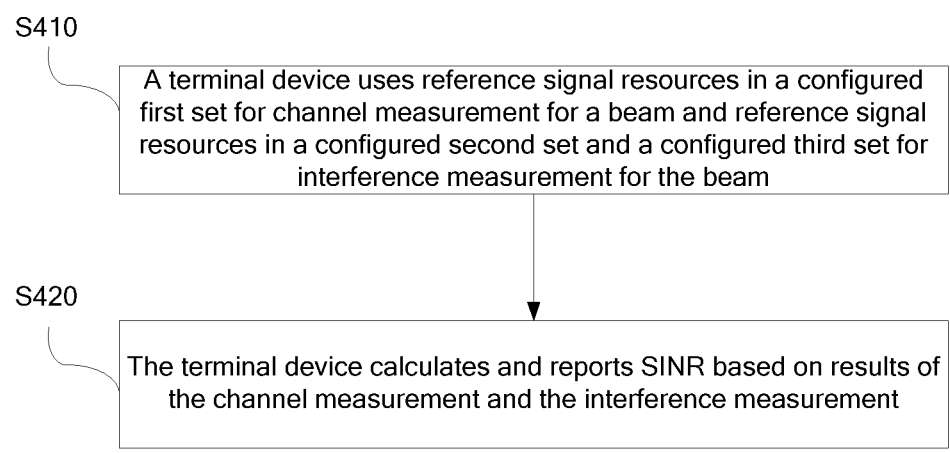
FIG. 4 is another schematic flowchart of a method for beam reporting according to an implementation of the present disclosure.

FIG. 4 is another schematic flowchart of a method for beam reporting according to an implementation of the present disclosure. As shown in FIG. 4, the method 400 includes S410 and S420.

In S410, a terminal device uses reference signal resources in a configured first set for channel measurement for a beam and reference signal resources in a configured second set and a configured third set for interference measurement for the beam.

In S420, the terminal device calculates and reports a SINR based on results of the channel measurement and the interference measurement.

For example, the terminal device can be configured with the first set of reference signal resources, which contains $N_1$ CSI-RS resources and/or SS/PBCH blocks, the second set of reference signal resources, which can contain $N_1 \times M_1$ CSI-RS resources, where $N_1 \geq 1$ and $M_1 \geq 1$ and the third set of reference signal resources, which can contain $N_1$ CSI-IM resources.

The value of $M_1$ can be 1, 2, 4 or 8. The CSI-RS resource configured in the first set can be associated with one or more CSI-RS resources configured in the second set and with one CSI-IM configured in the third set. To compute one L1-SINR, the terminal device can assume to use one CSI-RS resource or SS/PBCH block configured in the first set for channel measurement, and use one or more CSI-RS resources configured in the second set, which is associated with that selected CSI-RS resource or SS/PBCH block in the first set and one CSI-IM resource configured in the third set, which is associated with that selected CSI-RS resource or SS/PBCH block in the first set, to measure interference.

For the resources in the first set and the second set, the association can be the same as the association listed in FIG. 1 related contents, which is not repeated here.

For the third set, the reference signal resources in the third set can be associated with the reference signal resources in the first set one by one. The terminal device can assume each CSI-RS resource or SS/PBCH block in the first set is resource-wise associated with the CSI-IM in the third set by the ordering of the CSI-RS resource or SS/PBCH block in the first set and the CSI-IM in the third set for each L1-SINR calculation. In other word, the UE can assume the n-th (n=1, 2, ..., $N_1$) entry in the first set is associated with the n-th entry in the third set for each L1-SINR computation.

According to the implementations of the present disclosure, a terminal device uses reference signal resources in a configured first set for channel measurement for a beam and reference signal resources in a configured second set and third set for interference measurement for the beam, and the reference signal resources in the first set are associated by ordering with the reference signal resources in the second set and associated with the reference signal resources in the third set, so that the terminal device could calculate and report SINR based on results of the channel measurement and the interference measurement, then the terminal device and a network side device could select an appropriate beam for communication based on the SINR of beams.

The method for beam reporting according to the implementation of the present disclosure has been described in detail above from the terminal device side in conjunction with FIGS. 1 to 3.

Based on the same one inventive concept as the above stated methods, the terminal device according to an implementation of the present disclosure will be described in detail below in conjunction with FIG. 5. The details performed by the terminal device above with respect to FIGS. 1 and 4 could also be performed by the following corresponding modules of the terminal device, and some descriptions are omitted as appropriate in order to avoid duplication.

Figure 5:
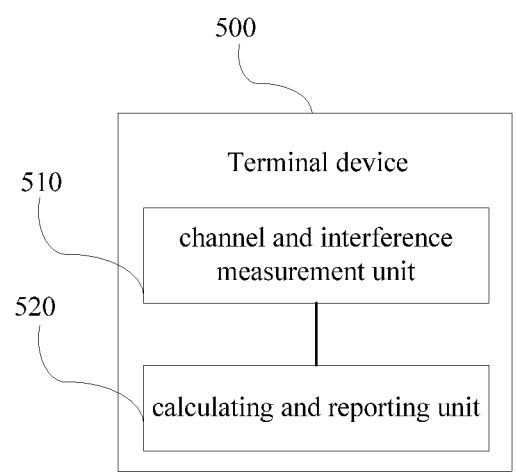
FIG. 5 is a block diagram of the terminal device according to an implementation of the present disclosure.

FIG. 5 is a block diagram of the terminal device according to an implementation of the present disclosure. As shown in FIG. 5, the terminal device 500 includes a channel and interference measurement unit 510 and a calculating and reporting unit 520.

The channel and interference measurement unit 510 is used for using reference signal resources in a configured first set for channel measurement for a beam and reference signal resources in a configured second set for interference measurement for the beam; wherein the reference signal resources in the first set are associated by ordering with the reference signal resources in the second set.

The calculating and reporting unit 520 is used for calculating and reporting SINR based on results of the channel measurement and the interference measurement.

In an example of the present disclosure, the reference signal resources in the first set are associated by ordering with the reference signal resources in the second set in the following way: the reference signal resources in the first set and the reference signal resources in the second set are configured in sequence; a reference signal resource in the first set is associated with one or more reference signal resources in the second set according to a position of the reference signal resource in the first set and positions of the one or more reference signal resources in the second set.

In an example of the present disclosure, different reference signal resources in the first set have different associated reference signal resources in the second set.

In an example of the present disclosure, the reference signal resources in the first set of reference signal resources are associated with the reference signal resources in the second set in the following way: the first set contains $N_1$ reference signal resources, the second set contains $N_1*M_1$ reference signal resources, and a $n_{th}$ reference signal resource in the first set is associated with a subset of $\{((n-1)\times M_1+1)_{th}, ((n-1)\times M_1+2)_{th}, \ldots, (n\times M_1)_{th}\}$ entry of reference signal resources in the second set, wherein n, $N_1$ and $M_1$ are natural numbers and n=(1, 2, . . . , $N_1$).

In an example of the present disclosure, the channel and interference measurement unit is used for receiving the reference signal resources in the second set for the interference measurement by applying a QCL (Quasi Co-Located)-Type D configuration of the reference signal resources in the first set when the QCL-Type D configuration is used during receiving the reference signal resources in the first set for the channel measurement.

In an example of the present disclosure, the reference signal resources in the first set are CSI-RS (Channel State Information-Reference Signal) resources and/or SS(Synchronization Signal)/PBCH (Physical Broadcast Channel) resources, the reference signal resources in the second set are CSI-RS resources and/or NZP (Non-Zero-Power) CSI-RS and/or CSI-IM (Channel State Information-Interference Measurement) resources.

In an example of the present disclosure, the channel and interference measurement unit is used for, when QCL-Type D configuration is configured to the CSI-RS resource or SS/PBCH block in the first set, receiving associated CSI-RS resource in the second set for interference measurement by taking that the associated CSI-RS resource is quasi co-located to a RS (Reference Signal), which is the RS with QCL-Type D configuration in a TCI (Transmission Configuration Index) state configured to the CSI-RS resource in the first set or the RS with respect to QCL configuration for the SS/PBCH block in the first set.

In an example of the present disclosure, the channel and interference measurement unit is used for, when QCL-Type D configuration is configured to the CSI-RS resource in the first set, receiving an associated CSI-IM resource in the second set for interference measurement by taking that the associated CSI-IM resource is quasi co-located to a RS, which is the RS with QCL-Type D configuration in a TCI state configured to the CSI-RS resource in the first set.

In an example of the present disclosure, the channel and interference measurement unit is used for, when QCL-Type D configuration is configured to a SS/PBCH block configured in the first set, receiving associated CSI-IM resource in the second set for interference measurement by applying the QCL configuration of the SS/PBCH block to receive the associated CSI-IM in the second set.

In an example of the present disclosure, the SINR is L1 (Level 1)-SINR.

In an example of the present disclosure, the SINR is a channel measurement result divided by an interference measurement result, or a linear average of channel measurement results divided by a linear average of interference measurement results.

In an example of the present disclosure, the SINR is a linear average over power contribution of resource elements carrying the reference signal resources in the first set divided by a linear average of noise and interference power contribution over resource elements allocated to the reference signal resources in the second set.

In an example of the present disclosure, the SINR is equal to Ps/Pi, wherein Ps is a linear average power over power contribution of resource elements carrying signals of the reference signal resources, Pi is a sum of linear average power over power contribution of resource elements carrying signals of each of the reference signal resources in the second set.

In an example of the present disclosure, the SINR is equal to Ps/Pi, wherein Ps is a linear average power over power contribution of resource elements carrying signals of the reference signal resources, Pi is a linear average power over power contribution of resource elements carrying signals of one or more of the reference signal resources in the second set.

In an example of the present disclosure, an indicator is reported with the SINR, and the indicator indicates the reference signal resources in the first set.

In an example of the present disclosure, information of value of L1-RSRP calculated over the indicated reference signal resources in the first set is further reported.

In an example of the present disclosure, another indicator indicating the reference signal resources in the second set is further reported.

In an example of the present disclosure, the interference measurement is performed by using the reference signal resources in the second set and a reference signal resource in a configured third set.

In an example of the present disclosure, the third set contains a same number of reference signal resources as that in the first set, and the reference signal resources in the third set are associated with the reference signal resources in the first set one by one.

Based on the same one inventive concept as the above stated methods, the terminal device according to an implementation of the present disclosure will be described in detail below in conjunction with FIG. 6. The details performed by the terminal device above with respect to FIG. 3 could also be performed by the following corresponding modules of the terminal device, and some descriptions are omitted as appropriate in order to avoid duplication.

Figure 6:
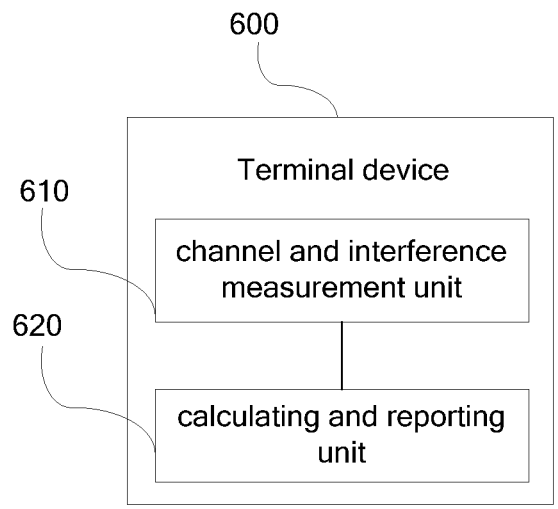
FIG. 6 is a block diagram of the terminal device according to an implementation of the present disclosure.

FIG. 6 is a block diagram of the terminal device according to an implementation of the present disclosure. As shown in FIG. 6, the terminal device 600 includes a channel and interference measurement unit 610 and a calculating and reporting unit 620.

The channel and interference measurement unit 610 is used for using reference signal resources in a configured first set for channel measurement and interference measurement for a beam; and the calculating and reporting unit 620 is used for calculating and reporting a SINR (Signal-to-Interference and Noise Ratio) based on the channel measurement and the interference measurement.

In an example of the present disclosure, a plurality of SINRs are calculated and reported based on the channel measurement and the interference measurement with a plurality of reference signal resources.

In an example of the present disclosure, a differential SINR between different SINRs is calculated and reported.

In an example of the present disclosure, a RSRP and/or differential RSRP is calculated and reported.

According to the implementations of the present disclosure, the terminal device uses different reference signal resources for channel measurement and interference measurement for a beam, so that the terminal device could calculate and report SINR based on results of the channel measurement and the interference measurement, then the terminal device and a network side device could select an appropriate beam for communication based on the SINR of beams.

Figure 7:
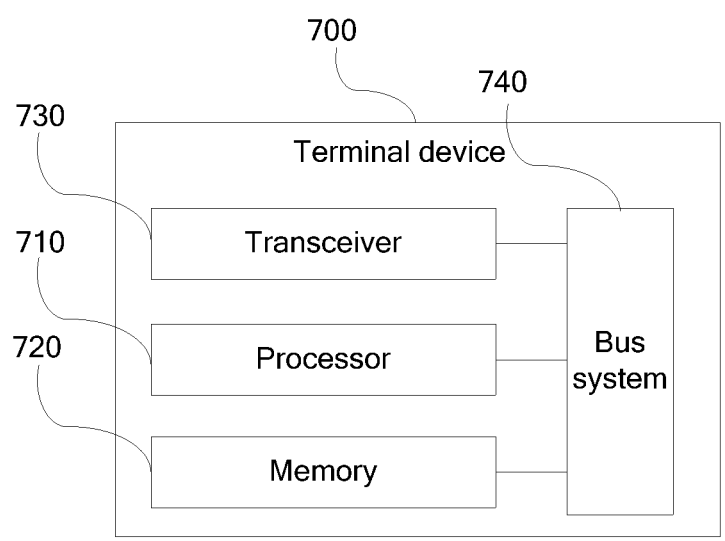
FIG. 7 is a block diagram of the terminal device according to yet another implementation of the present disclosure.

FIG. 7 is a block diagram of the terminal device according to yet another implementation of the present disclosure. As shown in FIG. 7, the terminal device 700 includes a processor 710 and memory 720. Optionally, the terminal device 700 may further include a transceiver 730, and a bus system 740. The processor 710, the memory 720 and the transceiver 730 may be connected through the bus system 740. The memory 720 may be used for storing computer programs, and the processor 710 is used for executing the computer programs stored in the memory 720 to control the transceiver 730 to send or receive information. It should be understood that all the actions listed in the method in combination with FIGS. 1 to 4 and the actions performed by the modules in the terminal device 500 or 600 recited above in combination with FIG. 5 or 6 may be performed by the processor 710 under the indication of programs in the terminal device 700, and some detailed descriptions are omitted as appropriate in order to avoid duplication.

Specifically, when the computer programs are performed by the processor 710, the processor 710 is used for using reference signal resources in a configured first set for channel measurement for a beam and reference signal resources in a configured second set for interference measurement for the beam; wherein the reference signal resources in the first set are associated by ordering with the reference signal resources in the second set; and calculating and reporting SINR based on results of the channel measurement and the interference measurement. Detailed descriptions have been disclosed in FIG. 5 related contents, and are omitted here as appropriate in order to avoid duplication.

In another implementation, when the computer programs are performed by the processor 710, the processor 710 is used for using reference signal resources in a configured first set for channel measurement and interference measurement for a beam; and calculating and reporting, by the terminal device, a SINR based on the channel measurement and the interference measurement. Detailed descriptions have been disclosed in FIG. 6 related contents, and are omitted here as appropriate in order to avoid duplication.

Herein, a computer readable medium is also provided. The computer readable medium is used for storing a computer program that includes instructions for performing the method for beam reporting as recited above in combination with FIG. 1 and/or FIG. 3 and/or FIG. 4 and their all examples or implementations.

Herein, a computer program product is also provided. The computer program product contains instructions, which, when being executed by the computer, causes the computer to implement the method for beam reporting as recited above in combination with FIG. 1 and/or FIG. 3 and/or FIG. 4 and their all examples or implementations.

It should be understood that in the above implementations of the present disclosure, the processor may be a central processing unit (CPU), or the processor may be other general purpose processor, digital signal processor (DSP), application specific integrated circuit (ASIC), off-the-shelf programmable gate array (FPGA) or other programmable logic device, discrete gate or transistor logic device, discrete hardware component, etc. The general purpose processor may be a microprocessor or the processor may be any conventional processor or the like.

The memory may include a read only memory and a random access memory, and provide instructions and data to the processor. A portion of the memory may also include a non-volatile random access memory. For example, the memory may also store device type information.

In the process, the actions of the method implementations described above may be accomplished by integrated logic circuits of hardware in the processor or instructions in the form of software. The acts of the method disclosed in connection with the implementation of the present disclosure can be directly embodied by the execution of the hardware processor or by the execution of the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and accomplishes the acts of the above method in combination with its hardware. In order to avoid repetition, it will not be described in detail here.

It should be understood that references throughout the specification to "one implementation" or "an implementation" mean that a particular feature, structure, or characteristic related to the implementation is included in at least one implementation of the present disclosure. Therefore, "in one implementation" or "in an implementation" appearing throughout this specification may not necessarily refer to the same implementation. Furthermore, these particular features, structures, or characteristics may be combined in any suitable manner in one or more implementations.

It should be understood that in various implementations of the present disclosure, the values of the sequence numbers in the above-mentioned processes do not indicate the order of execution, and the order of execution of various processes should be determined by its function and internal logic, and should not constitute any limitation on the process of the implementations of the present disclosure.

Those of ordinary skill in the art will recognize that the method steps and units described in connection with the implementations disclosed herein can be implemented in electronic hardware, computer software, or a combination of the two. In order to clearly illustrate the interchangeability of hardware and software, the acts and components of the implementations have been described in a functional general manner in the above description. Whether these functions are implemented in hardware or software depends on the specific application and design constraints of the technical solution. One skilled in the art may use different methods to implement the described functions for each particular application, but such implementation should not be considered to be beyond the scope of the present disclosure.

The methods or steps described in connection with the implementations disclosed herein may be implemented in hardware, a software program executable by a processor, or a combination of the hardware and the soft program executable by the processor. The software program may be placed in a random access memory (RAM), a memory, a read-only memory (ROM), an electrically programmable read-only memory (EPROM), an electrically erasable programmable read-only memory (EEPROM), a register, a hard disk, a removable disk, a compact disc read-only memory (CD-ROM), or any other form of storage medium known in the art.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation, for example, multiple units or components may be combined or integrated into another system, or some features may be ignored or not executed.

The unit described as a separate unit may or may not be physically separated, and the component shown as a unit may or may not be a physical unit, i.e., it may be located in one place or may be distributed over multiple network units. Some or all of the units can be selected according to actual needs to achieve the purpose of the implementations.

In addition, various functional units in various implementations of the present disclosure may be integrated in one processing unit, or the units may be physically present separately, or two or more units may be integrated in one unit.

Although the present disclosure has been described in detail with reference to the accompanying drawings and in connection with preferred implementations, the present disclosure is not limited thereto. Those skilled in the art may make various equivalent modifications or substitutions to the implementations of the present disclosure without departing from the spirit and essence of the present disclosure, and such modifications or substitutions are intended to be within the scope of the present disclosure.

I claim:

1. A method for beam reporting, comprising:
using, by a terminal device, reference signal resources in a configured first set for channel measurement for a beam and reference signal resources in a configured second set for interference measurement for the beam; wherein the reference signal resources in the first set are associated by ordering with the reference signal resources in the second set; and
calculating and reporting, by the terminal device, SINR (Signal-to-Interference and Noise Ratio) based on results of the channel measurement and the interference measurement,
wherein the reference signal resources in the first set are CSI-RS (Channel State Information-Reference Signal) resources and/or SS (Synchronization Signal)/PBCH (Physical Broadcast Channel) resources;
wherein the reference signal resources in the second set are CSI-RS resources and/or NZP (Non-Zero-Power) CSI-RS and/or CSI-IM (Channel State Information-Interference Measurement) resources;
wherein when QCL-Type D configuration is configured to the CSI-RS resource or SS/PBCH block in the first set, the terminal device receives associated CSI-RS resource in the second set for interference measurement by taking that the associated CSI-RS resource is quasi co-located to a RS (Reference Signal), which is the RS with QCL-Type D configuration in a TCI (Transmission Configuration Index) state configured to the CSI-RS resource in the first set or the RS with respect to QCL configuration for the SS/PBCH block in the first set.

2. The method according to claim 1, wherein for each SINR, one reference signal resource in the first set is used for the channel measurement and is associated with two reference signal resources in the second set, which are used for the interference measurement.

3. The method according to claim 1, wherein the reference signal resources in the first set are associated by ordering with the reference signal resources in the second set in the following way:
the reference signal resources in the first set and the reference signal resources in the second set are configured in sequence;
a reference signal resource in the first set is associated with one or more reference signal resources in the second set according to a position of the reference signal resource in the first set and positions of the one or more reference signal resources in the second set.

4. The method according to claim 1, wherein different reference signal resources in the first set have different associated reference signal resources in the second set.

5. The method according to claim 1, wherein the reference signal resources in the first set of reference signal resources are associated with the reference signal resources in the second set in the following way:
the first set contains $N^1$ reference signal resources, the second set contains $N_1*M_1$ reference signal resources, and a $n_{th}$ reference signal resource in the first set is associated with a subset of $\{((n-1)\times+1)_{th}, ((n-1)\times M_1+2)_{th}, \ldots, (n\times M_1)_{th}\}$ entry of reference signal resources in the second set, wherein n, $N_1$ and $M_1$ are natural numbers, and n=(1,2, ..., $N_1$).

6. The method according to claim 1, further comprising:
when QCL (Quasi Co-Located)-Type D configuration is used during receiving the reference signal resources in the first set for the channel measurement, receiving the reference signal resources in the second set for the interference measurement by applying the QCL-Type D configuration of the reference signal resources in the first set.

7. The method according to claim 1, wherein the SINR is L1 (Level 1)-SINR.

8. The method according to claim 1, wherein the SINR is a channel measurement result divided by an interference measurement result, or a linear average of channel measurement results divided by a linear average of interference measurement results.

9. The method according to claim 1, wherein the SINR is a linear average over power contribution of resource elements carrying the reference signal resources in the first set divided by a linear average of noise and interference power contribution over resource elements allocated to the reference signal resources in the second set.

10. The method according to claim 1, wherein the SINR is equal to Ps/Pi, wherein Ps is a linear average power over power contribution of resource elements carrying signals of the reference signal resources, Pi is a sum of linear average power over power contribution of resource elements carrying signals of each of the reference signal resources in the second set.

11. The method according to claim 1, wherein the SINR is equal to Ps/Pi, wherein Ps is a linear average power over power contribution of resource elements carrying signals of the reference signal resources, Pi is a linear average power over power contribution of resource elements carrying signals of one or more of the reference signal resources in the second set.

12. The method according to claim 1, wherein an indicator is reported with the SINR, and the indicator indicates the reference signal resources in the first set.

13. The method according to claim 1, wherein information of value of L1-RSRP (Reference Signal Received Power) calculated over the indicated reference signal resources in the first set is further reported.

14. The method according to claim 1, wherein another indicator indicating the reference signal resources in the second set is further reported.

15. The method according to claim 1, wherein the interference measurement is performed by using the reference signal resources in the second set and a reference signal resource in a configured third set.

16. The method according to claim 15, when the third set contains a same number of reference signal resources as that in the first set, the reference signal resources in the third set are associated with the reference signal resources in the first set one by one.

17. A terminal device, comprising: a processor and a transceiver, wherein
- the processor is used for using reference signal resources in a configured first set for channel measurement for a beam and reference signal resources in a configured second set for interference measurement for the beam; wherein the reference signal resources in the first set are associated by ordering with the reference signal resources in the second set; and
- calculating and reporting SINR (Signal-to-Interference and Noise Ratio) based on results of the channel measurement and the interference measurement,
- wherein the reference signal resources in the first set are CSI-RS (Channel State Information-Reference Signal) resources and/or SS(Synchronization Signal)/PBCH (Physical Broadcast Channel) resources;
- wherein the reference signal resources in the second set are CSI-RS resources and/or NZP (Non-Zero-Power) CSI-RS and/or CSI-IM (Channel State Information-Interference Measurement) resources; and
- wherein when QCL-Type D configuration is configured to the CSI-RS resource or SS/PBCH block in the first set, the terminal device receives associated CSI-RS resource in the second set for interference measurement by taking that the associated CSI-RS resource is quasi co-located to a RS (Reference Signal), which is the RS with QCL-Type D configuration in a TCI (Transmission Configuration Index) state configured to the CSI-RS resource in the first set or the RS with respect to QCL configuration for the SS/PBCH block in the first set.

* * * * *